June 11, 1940.  E. BOWER  2,204,245
SEED PLANTER
Filed Aug. 3, 1938
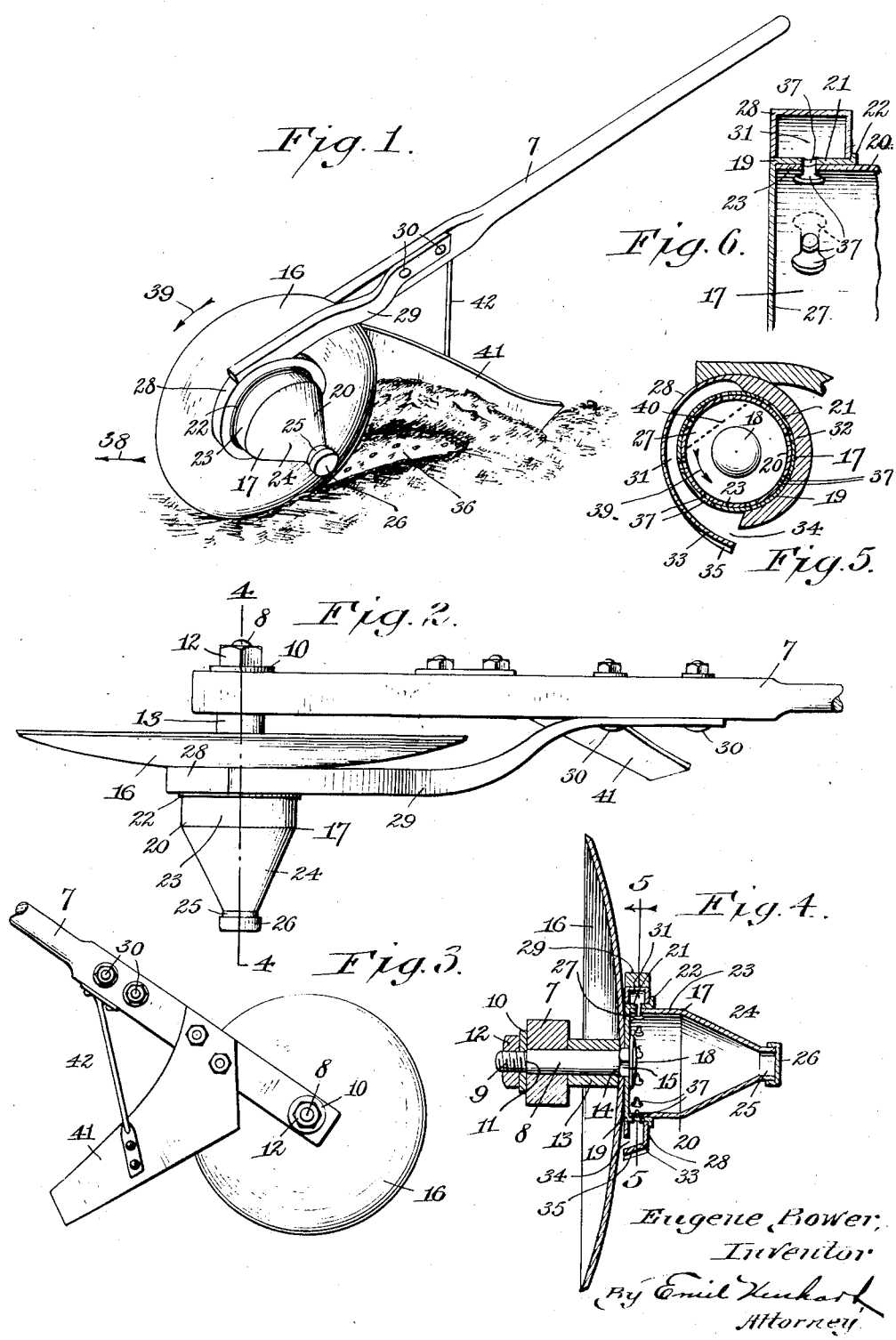
Eugene Bower, Inventor Patented June 11, 1940

2,204,245

UNITED STATES PATENT OFFICE 2,204,245

SEED PLANTER

Eugene Bower, Angola, N. Y.

Application August 3, 1938, Serial No. 222,857

5 Claims. (Cl. 111—82)

This invention relates to seed planters, and more particularly to the type used by truck farmers and for use in small gardens.

The primary object of my invention is to provide a comparatively small manually-operated seed planter which is inexpensive, simple in construction, and capable of planting seeds of various sizes.

Another object of my invention is to provide novel means for regulating the feeding of the seed and in associating therewith means for furrowing the ground to receive the seed; also, to provide means for covering the furrow with the seed therein during the act of extending the furrow by movement of the planter over the ground.

A further object of my invention is to provide new and novel means for distributing the seed and to otherwise improve on seed planters now in use.

With these and other objects in view, the invention consists in the novel features of construction and in the arrangement and combination of parts to be hereinafter described and more particularly pointed out in the subjoined claims.

In the drawing,

Fig. 1 is a perspective view of the complete seed planter.

Fig. 2 is a top plan view of one end thereof.

Fig. 3 is a side elevation of the lower end of the planter viewed from the side opposite that shown in Fig. 1.

Fig. 4 is a transverse section taken on line 4—4, Fig. 2.

Fig. 5 is a transverse section through the seed receptacle taken on line 5—5, Fig. 4, looking in the direction of the arrow crossing said line.

Fig. 6 is an enlarged section taken circumferentially through a portion of the seed receptacle.

The device may be termed a single-handled implement in which the handle, designated 7, forms a slender elongated frame member, or at least the main portion of the frame of the implement. Through one end of this handle or frame, which I will term the lower end, an axle in the form of a bolt 8 is passed which may have a reduced threaded outer end 9 over which a washer 10 is passed to bear against the shoulder 11 formed on said bolt by reducing the same and against one side of the handle or frame, and on this threaded portion a nut 12 is secured to bear against the washer and thus hold the bolt 8 rotatably within the handle or frame.

Surrounding this bolt is a spacing sleeve 13 which bears at one end against the opposite side of said handle or frame and at its other end against a shoulder 14 on said bolt formed by transversely enlarging the latter. This enlarged portion of the bolt is of square formation in cross section, as at 15, or it may be otherwise non-circularly shaped.

16 is a furrow-forming disk, and 17 a seed receptacle co-axial therewith, both of which are provided with axial openings into which the square or other non-circular portion 15 of the bolt 8 is fitted. The head 18 of the bolt is confined within the seed receptacle and bears against the inner wall thereof so as to force said receptacle against the outer convex side of the furrow-forming disk 16.

The seed receptacle comprises two telescoped relatively rotative parts 19, 20; part 19 being a circular dish-like inner member having a peripheral wall 21 provided at its outer end with an outstanding flange 22; and part 20 being a circular outer member having a cylindrical inner portion 23 fitting into the circular dish-like inner member 19 by a frictional fit and a tapering outer portion 24 provided with a neck 25 at its outer end which may be closed in any suitable manner, preferably by a cap 26.

In assembling the parts thus far described, the bolt 8 is passed through the flat inner wall 27 of the dish-like member 19 of said seed receptacle, thence through the furrow-forming disk 16, said flat inner wall and the furrow-forming disk fitting over the square or other non-circular portion 15 of said bolt. The spacing sleeve is then inserted over said bolt so that one end of said sleeve bears against the shoulder 14 of said bolt, after which the parts thus assembled are mounted on the handle or frame by inserting the bolt through the latter, and the bolt is rotatably fastened in said handle or frame by means of the washer 10 and nut 12. As thus arranged the part 19 of the seed receptacle and the furrow-forming disk are caused to rotate with the bolt, such rotative movement being created when the edge of the disk is forced downwardly into the soil and the planter moved forwardly by exerting force against the handle or frame in the general direction of the length thereof. It is of course understood that such assembly of the parts described is made prior to the application of the outer member 20 of the seed receptacle to the inner member 19, which application is effected by the mere insertion of the inner end of said outer member into the dish-like inner member 19 under the frictional fit existing between the two.

Prior to thus assembling the parts described, a combined supporting and control element 28 is positioned on the frame, and this is in the form of an annulus or annular member carried by a bracket or arm 29 secured to the handle or frame, as at 30. Therefore, in the act of assembling the parts thus far described, and prior to the application of the outer member 20 of the seed receptacle to the inner member 19, the latter, with or without the bolt 8, must be positioned within the combined supporting and control element, or the annulus 28, as it is more particularly described, before placing the furrow-forming disk 16 on the bolt, due to this disk being considerably larger than the combined supporting and control element, after which the assembly may be effected as above described. The annulus 28 is provided with a parti-circular feed passage 31 which extends preferably along substantially one-half the outer circumference of the dish-like inner member 19 of the seed receptacle, or as it may be stated, said feed passage is disposed at one side of a vertical plane passing through the axis of said seed receptacle; the remaining portion of said annulus being solid, as at 32, to contact said inner member 19. At the lower portion of the annulus the peripheral outer wall of the parti-circular feed passage 31 is directed outwardly in substantially a tangent plane, as at 33, so as to provide a delivery opening 34 for said feed passage; and where said peripheral outer wall is substantially tangentially directed, it is inclined downwardly and inwardly, as at 35, so that said substantially tangential portion is inclined both laterally and rearwardly to cause seed traveling through said passage to be delivered against the furrow-forming disk 16, with the result that such seed is automatically delivered into the furrow, designated 36 in Fig. 1.

The seed to be planted is placed within the seed receptacle 17, it being simply necessary to tilt the device sidewise and remove the cap 26 from the neck of said receptacle. The receptacle may be partially or entirely filled with the seed, and in order to assure delivery of the seed into the parti-circular passage 31 of the combined supporting and control element, the peripheral walls of the two telescoped parts of said receptacle are provided with feed openings 37 which, when the device is not in operation, may be brought out of registration by rotating the outer member 20 within the inner member. Thus the seed is confined within the receptacle without possibility of escape.

The openings 37 are of substantially keyhole formation so that each has two parts of different transverse dimensions. The smaller dimensioned portions of the feed openings in both members of the receptacle may be brought into registration, as shown in Fig. 6, for feeding small-size seed, and upon rotating the outer member within the inner member, the large dimensioned portions of said openings may be brought into registration for feeding large-size seed. These keyholes may be brought to complete registration so that the ends of co-acting feed openings in the two members of the receptacle will be alined and, therefore, seed of an elongated nature may be fed into the feed passage 31 of the combined supporting and control element 28.

In the act of planting seed, the device is moved in the direction of the arrow shown at 38 in Fig. 1 which causes the disk and seed receptacle to rotate in the direction of the arrows 39 shown in each of Figs. 1 and 5. During this action the seed has a tendency to level itself off on an incline, as indicated by the dotted line 40 in Fig. 5; and since, as shown in said figure, the openings 37 at one side of the vertical center of the seed receptacle are closed by the solid portion 32 of the combined supporting and control element 28, there is no possibility of seed escaping along the rear half of said receptacle. Moreover, since the seed does not reach the paired feed openings along the crest of the peripheral walls of the telescoped parts of said seed receptacle, seed escapes through the openings 37 only as they pass through the lower forward quarter of the circular path through which they travel, thus the seed is economically fed and no waste takes place.

The furrow-forming disk furrows the soil and the seed delivered into the furrow is immediately covered up by the use of a covering blade 41 which is secured to the handle or frame of the device near its lower end and directed rearwardly and laterally to extend beyond the plane in which the edge of the furrow-forming disk 16 travels. It will be apparent, therefore, that a comparatively short length of furrow or trench is exposed at any time and that the soil hilled up by forming the furrow is immediately returned to cover up the seed and fill the furrow. This covering blade is held in firm position by a brace 42 secured at one end to the rear of the blade and at its other end to the handle or frame, as clearly shown in Fig. 3.

I desire to stress the fact that by reason of the outer portion of the seed receptacle being tapered outwardly, the tendency of this portion is to urge the seed inwardly toward the feed openings 37, and this is of particular advantage when the seed reaches a low level within the receptacle. It is also to be noted that the furrow-forming disk serves as the traction or supporting wheel and therefore aids in the advancing of the implement or device over the ground, while simultaneously therewith forming the furrow into which the seed is to be delivered.

Having thus described my invention, what I claim is:

1. A seed planter, comprising a slender elongated frame member serving as the handle of the planter and having an axle rotatable therein, a furrow-forming disk serving also as a traction element rotatable with said axle, a seed receptacle co-axial with said disk and comprising two relatively movable parts provided with feed openings adapted to be paired and brought into or out of registration upon relative movement of said parts, said seed receptacle being rotatable with said disk, and a stationary annular member surrounding said seed receptacle at the region of the feed openings therein and having a parti-circular seed discharge passage at one side of a vertical plane passing through the axis of said seed receptacle to receive seed from the latter, said discharge passage having a discharge opening at a low point of said annular member.

2. A seed planter, comprising a frame, a furrow-forming disk rotatably mounted on said frame, a seed receptacle co-axial with said furrow-forming disk and rotatable therewith, said seed receptacle having a circular series of feed openings therein, and controlling means surrounding said seed receptacle at the region of said feed openings to control the feeding of seed from said receptacle, said controlling means having a parti-circular seed passage receiving seed from said receptacle and including means to direct the seed into the trough formed by said furrow-forming disk.

3. A seed planter, comprising a frame, a furrow-forming disk rotatably mounted on said frame, a seed receptacle co-axial and rotatable with said furrow-forming disk and comprising two telescoped members arranged for relative rotative movement, said members having feed openings therein adapted to be brought into varying registrations or moved out of such registrations upon relative rotative movement of said members, an annular member carried by said frame surrounding said seed receptacle at the region of the openings therein and having a feed passage terminating at the bottom of said annular member, said feed passage receiving seed from said seed receptacle at a comparatively high point and having means to discharge seed at the bottom of said annular member and direct same toward said furrow-forming disk.

4. A seed planter, comprising a frame, a furrow-forming disk rotatably mounted on said frame, a seed receptacle co-axial with said furrow-forming disk and extending laterally therefrom, said seed receptacle comprising two telescoped members, one frictionally fitting into the other, each of said members having openings therethrough adapted to be moved into or out of registration upon rotating one of said members with respect to the other, and an annular member supported by said frame and having said seed receptacle rotatable therein, said annular member having a parti-circular solid portion completely covering openings in said seed receptacle during its rotative movement within said annular member and having a parti-circular feed passage extending from end to end of said solid portion, the outer peripheral wall of said seed passage being disposed substantially tangentially to provide a discharge opening for the seed and being inclined laterally toward the furrow-forming disk to direct the seed toward the latter so as to assure deposit of the seed in the furrow formed by said disk.

5. A seed planter, comprising a slender elongated frame member serving as a handle for the planter and having a bolt rotatable in its lower end, said bolt having a head and an enlarged non-circular portion adjacent said head forming a shoulder, a seed receptacle having an axial opening into which the non-circular portion of said bolt fits and being provided with feed openings, a furrow-forming disk having an axial opening fitting the non-circular portion of said bolt, a spacing element around said bolt between said frame and said disk and bearing at one end against said shoulder and at its other end against said frame, said bolt having a reduced outer end to form a second shoulder, a washer around said bolt bearing against said frame and said second shoulder, and a nut applied to the outer end of said bolt and bearing against said washer.

EUGENE BOWER.